(12) United States Patent
Cable

(10) Patent No.: US 6,813,271 B1
(45) Date of Patent: Nov. 2, 2004

(54) SATELLITE COMMUNICATIONS SYSTEM AND METHOD OF SUPPORTING ATM CELL TRANSMISSIONS IN A DVB ENVIRONMENT

(75) Inventor: Julian Frank Barry Cable, Bishops Stortford (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/408,960

(22) Filed: Sep. 30, 1999

(51) Int. Cl.[7] .............................................. H04L 12/56
(52) U.S. Cl. .................................. 370/395.1; 370/486
(58) Field of Search .................... 725/63, 67; 455/3.01, 455/3.03; 370/310.1, 395.1, 395.51, 465, 485, 486, 487, 385

(56) References Cited

U.S. PATENT DOCUMENTS

| | | | |
|---|---|---|---|
| 5,420,866 A | * | 5/1995 | Wasilewski |
| 5,467,342 A | * | 11/1995 | Logsdon et al. |
| 6,151,318 A | * | 11/2000 | Woodward ................... 370/392 |
| 6,445,707 B1 | * | 9/2002 | Iuoras et al. ........... 370/395.43 |
| 6,504,845 B1 | * | 1/2003 | Petersen et al. ............ 370/412 |
| 6,628,678 B2 | * | 9/2003 | Temple et al. .............. 370/536 |

* cited by examiner

Primary Examiner—Kenneth Vanderpuye
(74) Attorney, Agent, or Firm—Barnes & Thornburg LLP

(57) ABSTRACT

ATM cells (131–133, 141–143) are encapsulated within a DVB satellite transmission environment (10) to provide satellite broadband capabilities (74). as shown in FIG. 1. Specifically, DVB multiplexing (as opposed to ATM multiplexing), either at the ground station (71) associated with a content provider (32–28) or within a satellite (12) itself, consolidates the use of a mapping function (170) between the Program Identity (PID) of an MPEG transport (data-) stream and an ATM physical layer (PHY). More particularly, robust packaging of full (131–133) and partial (134, 144) ATM, cells within a DVB transport stream packet (150) is supported by a system-wide association between PIDs and ATM PHYs, whereby an addressed terminal or subscriber unit (18–22) reassembles ATM cells (160–162) based on PID information contained in received DVB transport stream packets (150). In the event that ATM cell information is dispersed (134, 144) between different DVB transport stream packets (150), buffering of the PID-related information allows subsequent reconstruction of the related ATM cell. All ATM processing is hence accomplished in an ATM domain, with onward routing controlled by an ATM switch fabric core (108) responsive to ATM PHY data.

38 Claims, 4 Drawing Sheets

| Input | | | Output | | |
|---|---|---|---|---|---|
| PHY | VPI | VCI | PHY | VPI | VCI |
| 15 | 0 | 1 | 0 | 0 | 100 |
| 15 | 0 | 7 | 0 | 0 | 101 |
| 16 | 4 | 38 | 0 | 0 | 102 |
| 20 | 6 | 17 | 0 | 0 | 103 |
| | | | | | |

| PID (of interest) | PHY |
|---|---|
| x | 15 |
| y | 16 |
| z | 17 |
| etc. | etc. |

SATELLITE COMMUNICATIONS SYSTEM AND METHOD OF SUPPORTING ATM CELL TRANSMISSIONS IN A DVB ENVIRONMENT

BACKGROUND TO THE INVENTION

This invention relates, in general, to the interworking of a satellite communication system with a broadband transport mechanism and is particularly, but not exclusively, applicable to a transport methodology in which multiple asynchronous transmission mode (ATM) cells are encapsulated into and recovered from an MPEG/DVB data-piping environment.

SUMMARY OF THE PRIOR ART

Communication systems, in general, each have specific frame structures and signalling protocols. Unfortunately, when designers subsequently attempt to utilise one communication environment to support the effective transfer of data emanating from a different communication environment, efficient and robust packaging of encapsulated traffic becomes an issue, especially since frame lengths are seldom directly compatible.

To date, it is believed that the merging of multiple ATM traffic streams onto a satellite channel has not been considered, although there are clearly significant technical issues that need to be resolved. For example, the encapsulation of ATM traffic in a digital video broadcasting satellite (DVB-S) frame using data piping would cause ATM cells to be split over contiguous transport stream packet boundaries. Indeed, if more than one ATM stream is present in the satellite up-link, then efficient use (i.e. full packing) of the transport stream can result in data corruption. More specifically, the interleaving of different sources onto the transport stream in a bandwidth efficient manner will generally result in the corruption of certain of the ATM cells at the point of their recovery. In effect, there is an attempt to merge several transport streams (carrying data) into a single transport stream that is receivable by one or more terminals using on-board processing in the satellite. In this context, a natural model is to consider the satellite as a switch and then to reconcile destination terminals as ATM end systems attached to the switch. Extending this thought process leads to a possible solution in which a single ATM stream is directed towards a terminal and such that it resembles a single MPEG/DVB elementary stream, i.e. that the single stream should be on a single PID. However, if one merges transport stream packets form multiple sources on a PID then the system only works if the start and end of the transport stream packets are always cell boundaries, and this therefore requires the use of padding (and the loss of useable bandwidth).

In generality, an MPEG transport (data-) stream is prepended by a sixteen-bit header; this is the Program Identity (i.e. the PID). The PID is indicative of a label of an information source (sometimes referred to as a "content provider"). If padding is not used to correlate transport stream boundaries with ATM cell boundaries then the use of a single PID for all up-links and the multiplexing of the data onto a single transport stream hence results in a specific ATM cell (from an identified data source) being dispersed in time and such that the data of the specific ATM cell is partitioned between non-contiguous transport streams. At re-assembly of the specific ATM cell at a node (such as a terrestrial network connection), error is therefore likely. Furthermore, to recover and coherently decode an ATM stream at an addressed unit, different content providers cannot use the same VPI/VCI combination.

Each transport stream packet has an overall length of about 188 bytes, and so is about three-and-a-half-times (3.5×) longer than a conventional ATM cell (nominal length of fifty-three bytes). Clearly, therefore, efficient packaging involves the partitioning of ATM frames and the associated problems of coherent data recovery, whereas ATM cell boundary alignment is only maintained at the expense of loss of bandwidth (and the use of an additional bit in the header that identifies "padding"). More specifically, in the latter instance, multiple ATM sources can be interleaved into a MPEG/DVB-S frame in a non-optimum fashion by using padding, whereby only whole ATM cells are packaged into a particular transport stream. Alternatively, the MPEG (Motion Picture Expert Group) layer can be removed. In any event, the virtual path identifier (VPI) and virtual circuit identity (VCI) space must be coordinated between the data sources.

It is envisaged that one could contemplate the use of virtual path (VP) multiplexing, but this would only mitigate the coordination issue and would not address the requirement for padding.

With only a limited frequency spectrum available, any waste of bandwidth is of considerable concern to system operators, especially since it represents an associated cost burden. Indeed, sub-optimum use in capacity is undesirable and generally causes the system to be less competitive and, usually, less profitable.

In the context of DVB, there are various derivatives employed within different environments. There are three forms of forward channel, namely DVB-T (for terrestrial): DVB-C (for Cable): and DVB-S (for Satellite). And there are at least three kinds of return channel, namely terrestrial PSTN, DVB-RCCL (return channel for cable and LMDS) and DVB-RCD (return channel for satellite). DVB-MPE (for multi-protocol encapsulation systems) and DVB-Data piping are two of at least three ways of carrying data over any of the forward channels. More especially, the DVB-MPE derivative is configured to implement segmentation and re-assembly of Internet protocol (IP) datagrams over an MPEG stream, whereas the data piping derivative (as already implied) is used to carry generic data streams (such as ATM cells) in a DVB environment.

SUMMARY OF THE INVENTION

According to a first aspect of the present invention there is provided a method of conveying data from a plurality of content providers across a satellite system supporting broadband communication, the method comprising: encapsulating, utilising a digital video broadcasting (DVB) protocol, a mixture of full and partial broadband cells but at least a partial broadband cell into a transport stream packet having a physical identity (PID) header: the step of encapsulating further including: mapping the broadband cells from a particular content provider onto a PID associated with that particular content provider; whereby each transport stream packet contains information from a specific content provider identified by the PID header of the transport stream packet.

In a preferred embodiment, the satellite system comprising at least one satellite and at least one station having an up-link, and the method further comprises: DVB multiplexing transport stream packets having different PID header at at least one of said at least one satellite and said at least one station having said up-link.

Preferably, at a recipient device responsive to the transport stream packet, a preferred embodiment of the operating methodology further includes: deriving a broadband PHY from the PID header: and, from the transport stream packet, recovering and then outputting broadband cells with their associated broadband PHYs.

Preferably, the method further comprises the step of determining whether the transport stream packet received by the recipient device is part of an elementary stream assigned to carry broadband traffic. The step of determining typically further comprises cross-referencing the PID of the transport data packet with broadband PHY information.

The preferred method of the first aspect of the present invention may also include the further steps of buffering any partial broadband cell received in the transport stream packet and referencing any such buffered partial broadband cell with a stream label.

In relation to any buffering, the method further comprises the steps of: reviewing the stream label of any buffered partial broadband cell upon receipt of successive transport stream packets; and outputting the buffered partial broadband cell with an associated broadband PHY in the event that the successive transport stream packet contains an associated partial broadband cell that is complementary to the buffered partial broadband cell and such that a complete broadband cell with associated broadband PHY is constructed and output from a combination of the buffered partial broadband cell and the associated partial broadband cell.

In another embodiment, the step of encapsulating further includes encapsulating residual partial broadband cell information excluded from a previous transport stream packet associated with a particular content provider into a next available transport stream packet assigned to that particular content provider.

An order in the output of broadband cells originating from each content provider is preserved.

In a second aspect of the present invention there is provided a satellite system supporting a transmission of broadband data, the satellite system comprising: a communication device having: means for encapsulating a mixture of full and partial broadband cells but at least a partial broadband cell into a transport stream packet having a physical identity (PID) header; and means for mapping the broadband cells from a particular content provider onto a PID associated with that particular content provider and such that each transport stream packet contains information from a specific content provider identified by the PID header of the transport stream packet.

The communication device is one of a satellite, a ground station and terminal associated with a content provider.

The satellite system comprises a satellite and a station having an up-link capability, and wherein at least one of the satellite and the station comprises a DVB multiplexer to multiplex transport stream packets having different PID header.

In a further aspect of the present invention there is provided a broadband communication device having: means for encapsulating a mixture of full and partial broadband cells but at least a partial broadband cell into a transport stream packet having a physical Identity (PID) header; and means for mapping the broadband cells from a particular content provider onto a PID associated with that particular content provider and such that each transport stream packet contains information from a specific content provider identified by the PID header of the transport stream packet.

In yet another aspect of the present invention there is provided a receiver responsive to satellite-relayed broadband signals encapsulated in a transport stream packet having a physical identity (PID) header, the broadband signals being a mixture of full and partial broadband cells but at least a partial broadband cell, the receiver having: means for deriving a broadband physical layer part (PHY) from the PID header, and means for recovering and then outputting broadband cells with their associated broadband PHYs from the transport stream packet.

In still yet another aspect of the present invention there is provided a method of recovering satellite-relayed broadband signals encapsulated in a transport stream packet having a physical Identity (PID) header, the broadband signals being a mixture of full and partial broadband cells but at least a partial broadband cell and wherein the broadband cells from a particular content provider are mapped onto a PID associated with that particular content provider and each transport stream packet contains information from a specific one of a plurality of content providers identified by the PID header of the transport stream packet, the method of recovering the broadband signals comprising: deriving a broadband physical layer part (PHY) from the PID header: and recovering and then outputting broadband cells with their associated broadband PHYs from the transport stream packet.

The method of recovering satellite-relayed broadband signals may further comprise determining whether the received transport stream packet is part of an elementary stream assigned to carry broadband traffic.

The method of recovering satellite-relayed broadband signals may also include buffering any partial broadband cell received in the transport stream packet and referencing any such buffered partial broadband cell with a stream label.

In the preferred embodiments of the present invention, all broadband processing (such as AAL processing) is therefore advantageously accomplished in the broadband (ATM) domain. Advantageously, no padding within the transport stream packet is required, while the satellite (or the ground station providing the point of data entry) is able to DVB multiplex the PIDs onto a single MPEG transport stream.

BRIEF DESCRIPTION OF THE DRAWINGS

An exemplary embodiment of the present invention will now be described with reference to the accompanying drawings, in which.

DETAILED DESCRIPTION OF A PREFERRED EMBODIMENT

Figure 1:
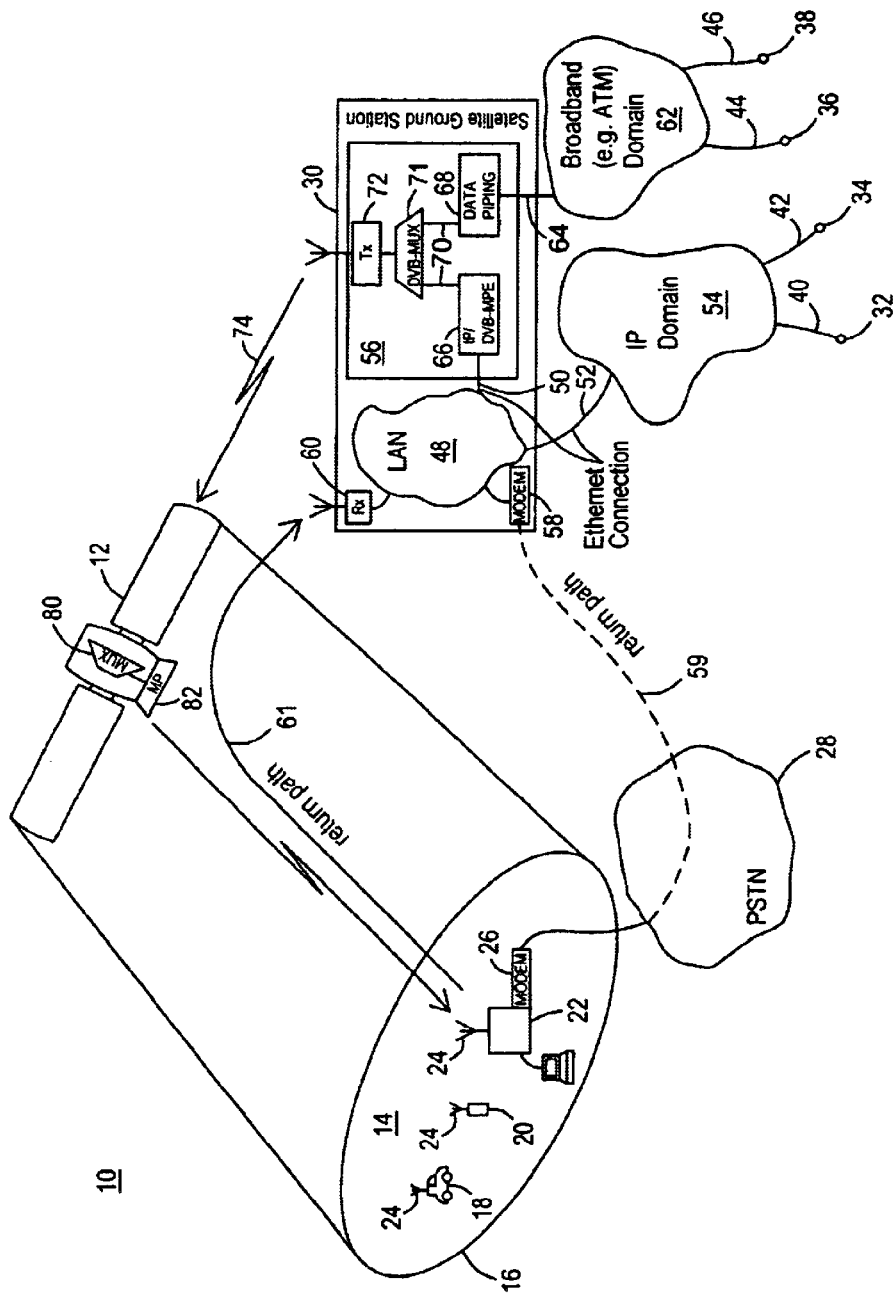
FIG. 1 is a block diagram of a satellite communication system having broadband capabilities capable of supporting the signal encapsulation mechanism of a preferred embodiment of the present invention.

A satellite communication system 19, as shown in FIG. 1, is able to support a broadband signal encapsulation mechanism of a preferred embodiment of the present invention. The satellite communication system 10 comprises a plurality of earth-orbiting satellites 12, only one of which is shown for the sake of clarity. Each satellite may support the transmission of multiple output beams to other satellites (not shown) within an associated constellation, but each satellite generally at least provides a terrestrial service location 14 identified by footprint 16. The service area 14 includes a plurality of subscriber terminals 18–22, some of which may be fixed to a particular location and some mobile. Each subscriber terminal 18–22 includes at least a receiver and more typically a transceiver (as generally represented by the antenna icon 24).

An exemplary connection path is illustrated in relation to subscriber terminal 22 that can be considered to be a personal computer (PC) or network connection. There may be some form of supplementary modem 26 associated with the subscriber terminal 22, with the modem 26 providing access into a wireline or wireless communication architecture. For example, the modem 26 may provide access into a public switched telephone network (PSTN) 28 which may in turn provide a return path to some form of satellite ground station 30 from which a broadband call to the subscriber terminal 22 is originally initiated.

The satellite 12 could be deployed within any existing satellite system, including but not limited to the SkyPlex (or similar) satellite communication system, although the satellite 12 could equally support new satellite-based communication system architectures.

In relation to the satellite ground station 30, this could serve a plurality of content providers 32–38 who access the ground station 30 via dedicated wireline resources (or the like) 40–46. In this particular scenario, the cost of leasing such dedicated wireline resources may be significant enough for the content provider to consider having direct up-link access to the satellite through the provisioning of a suitable transmitter arrangement. The case of direct satellite access will be explored later since modification of the satellite hardware architecture is required.

For completeness, when looking in some more detail at the satellite ground station 30, one can typically expect the architecture to include some form of local area network (LAN) 48 from which ethernet connections (or the like) 50–52 provide access to an Internet Protocol (IP) environment 54 or a transmitter path 56. The LAN 48 may have an associated modem 58 providing access into the PSTN 28, for example, and hence to realise a potential return path 59 from a satellite-addressed subscriber terminal 22–26. Some form of wireless receiver chain 60 may also be supported by the satellite ground station 30, such as through the LAN 48, with the wireless receiver chain providing an alternative return path 61 for the satellite-addressed subscriber terminal, as will readily be appreciated by the skilled addressee. Basically, this is one example of a number of different parallel communication encapsulation techniques that could complement the system of the present invention.

The satellite ground station 30 may also, or alternatively, be coupled to a broadband domain 62, such as an ATM architecture through an STM-1 or OC3C broadband interface 64.

The ATM domain 54 and broadband domain 62 provide a connection medium to content providers 32–38 wishing to gain access to the satellite up-link capabilities of the satellite ground station 30.

In relation to content provides accessibility to the satellite 12, the transmission path is dependent upon whether the content provider 32–38 is serviced through the IP domain 54 or broadband domain 62. In the event of an IP-serviced content provider, ethernet connection 50 from the LAN 48 provides access to an IP/DVB-MPE interworking function 66 that controls the packaging of data into transport stream packets. For a broadband-serviced content provider, the broadband interface provides access to a data piping interworking function 68 that implements ATM cell chopping at the transport stream boundaries. The interworking functions are typically realised in a suitably fast microprocessor environment, although they are more likely implemented (using today's technologies) by Application Specific Integrated Circuits (ASICs) or Field Programmable Gate Array (FPGA) technologies.

In either instance, after application of a suitable interworking function in then up-link path, a transport stream 70 is applied to a DVB multiplexer (DVB-MUX) 71 to consolidate different data paths before being applied to transmitter circuitry 72 for modulation onto a carrier 74. As will readily be appreciated, the transmitter circuitry 72 includes various filter, amplifier and encryption/modulation stages.

As will now be appreciated, a principal question to be resolved is how does one effectively decode transport streams into discrete ATM cells from an ATM multiplexed satellite DVB transmission. In broad brush, a part of the solution to this issue is to utilise DVB multiplexing (as opposed to ATM multiplexing), which DVB multiplexing can be actioned either in the satellite ground station 30 in the case of a single up-link access point, and/or within the satellite itself if multiple independently operable up-links are incident on the satellite 12. In the latter instance, the satellite 12 must include a DVB multiplexer 80 and associated control logic, such as realised within a transputer or microprocessor 82. Moreover, each up-link is assigned and uses (on a system basis) a separate PID.

Advantageously, if the satellite 12 includes a DVB multiplexer 80, there is a significant simplification in ground station complexity, although the issue of assigning system-wide non-colliding PIDs still needs to be addressed, as discussed below.

Figure 2:
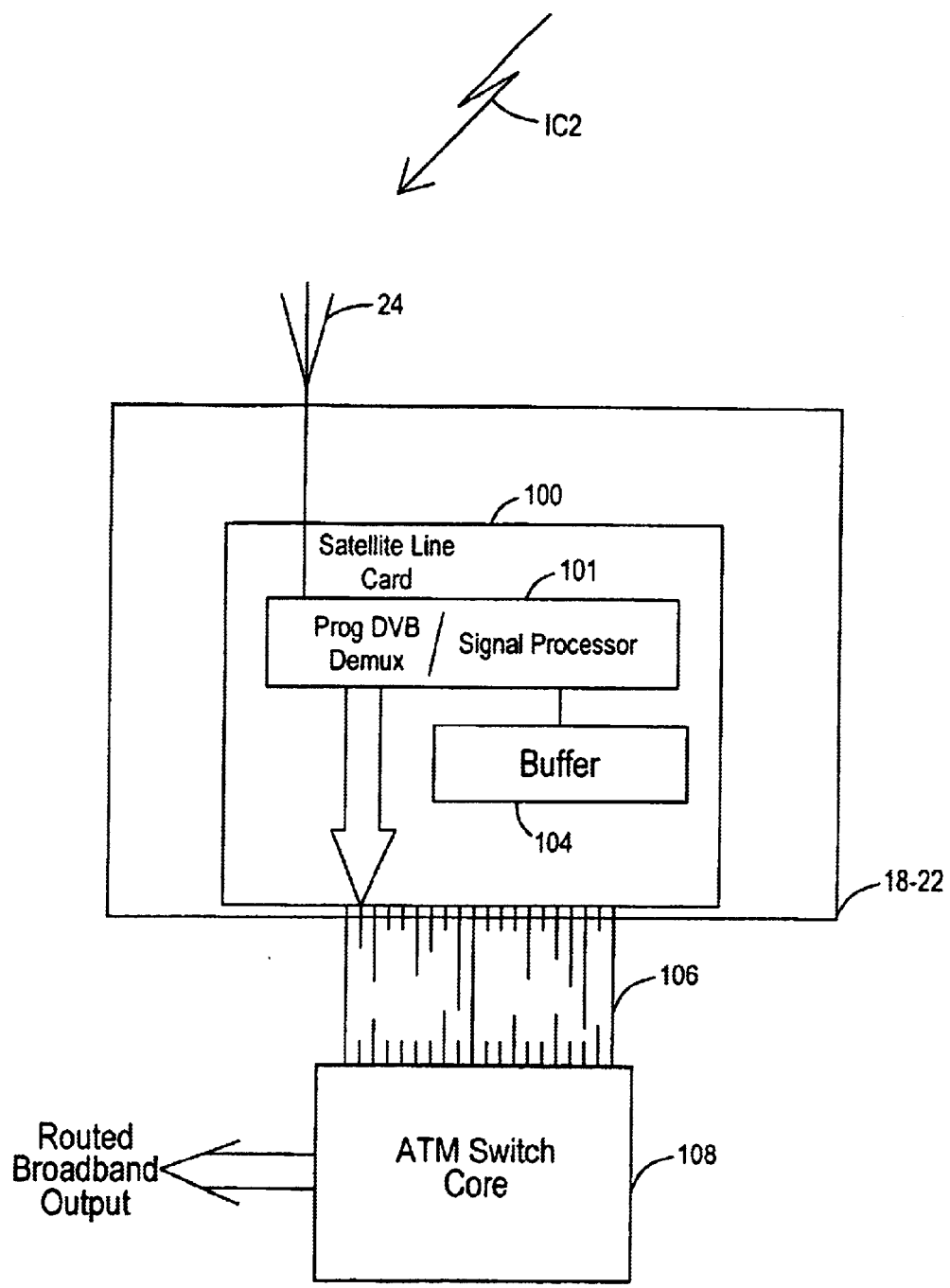
FIG. 2 is a block diagram of a terminal or subscriber unit that is arranged to receive and decode encapsulated ATM traffic in DVB-S frame.
Figures 5, 6:
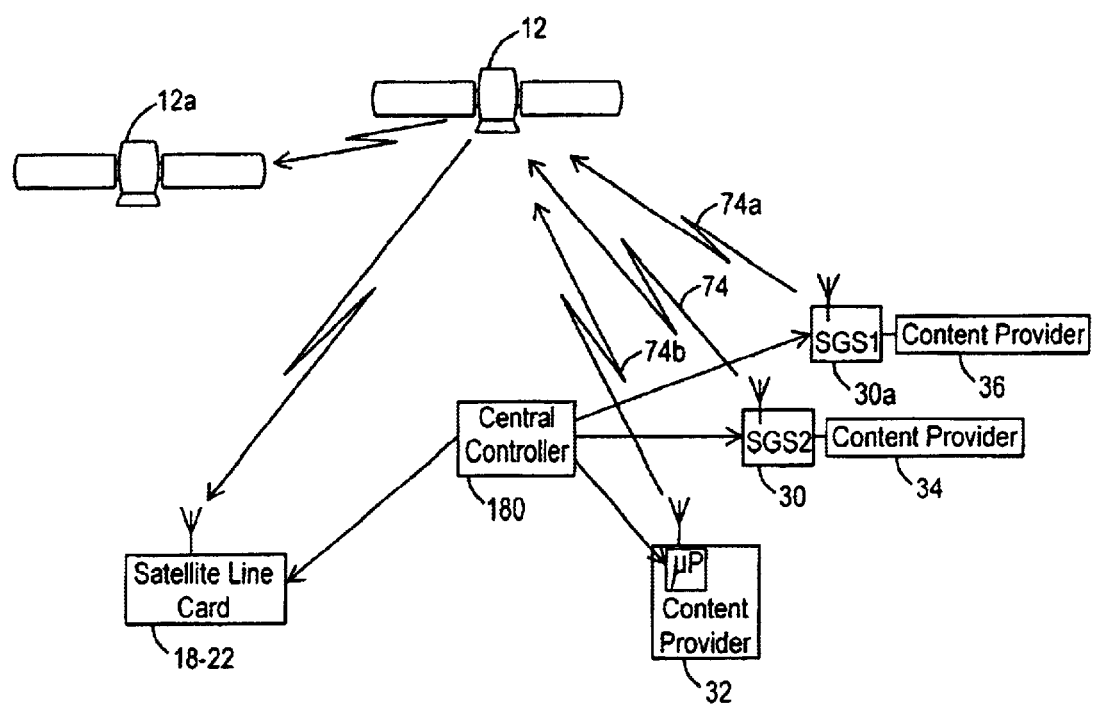
FIG. 5 illustrates a PID to PHY mapping function used within a preferred embodiment of the present invention.
FIG. 6 shows a system embodiment of the present invention in which a plurality of content providers have independent access to satellite up-link paths.

The basic structure of a terminal or subscriber unit 18–22 that is arranged to receive and decode encapsulated ATM traffic in a DVB-S frame of the present invention is shown in the block diagram of FIG. 2. The terminal of subscriber unit 18–22 is typically structured to include a satellite line card 99 having a programmable DVB demultiplexer or signal processor 101 responsive to encapsulated ATM traffic in a DVB-S frame signal 102. The programmable DVB multiplexer 101 converts DVB-S transport stream packets into ATM cells and emits them via output interface 106 which is a multi-PHY Utopia (or similar) interface. Buffering of data may therefore be required to ensure unitary and complete ATM cell output over the output interface 106 (realised, for example, as a parallel eight-bit or sixteen-bit wide Utopia bus). More specifically, when a transport stream (TS) packet is received it is first checked to see if it is part of one of the elementary streams carrying ATM traffic; this is done by referencing the PID to a PID-to-PHY mapping function (shown and described in relation to FIG. 5). If the PID is found in the table then an associated buffer 104 is checked to see if it contains a partial cell. If the buffer 104 does contain a partial cell then it is emitted over the output interface 106 and the remainder of the cell (which forms part of the newly received TS-packet) is then emitted. Thereafter, any remaining ATM cells within the TS-packet (amounting in total to typically two or three ATM cells) are emitted over the output interface 106. If the TS-packets ends with a partial ATM cell then the partial ATM cell is stored in the buffer 104 for that particular (PID) stream. All cells output via the output Interface 106 are prefixed by a PHY ID octet, in accordance with the conventional operation of a multi-PHY Interface. The PHY ID octet is derived from the PID according to an algorithmic mapping or table mapping function (as illustrated in FIG. 5). The Utopia bus is therefore a multi-port output from the terminal, which multi-port output is coupled to a conventional ATM switch core 108.

The function of the ATM switch core 108 is principally that of routing, and a typical ATM switch core is described in U.S. Pat. No. 5,745,486-Beshai et al and U.S. Pat. No. 5,126,999-Munter. If the terminal is to be located within customer premise equipment (CPE) having real end systems attached via conventional ATM line cards, then the ATM switch core connection is clearly appropriate. However, other scenarios exist in which the Utopia interface, for example. connects directly to ATM adaptation layer (AAL) equipment such as AAL-5 segmentation and re-assembly (SAR) chips and/or AAL-1 or AAL-2 adaptation entities, and thence to the internal busses of the CPE. Such internal busses may be the peripheral component interconnect (PCI) bus for AAL-5 traffic, the signal computing system architecture (SCSA) bus for AAL-1 traffic and a digital signal processor (DSP) for AAL-2.

Figures 3, 4:
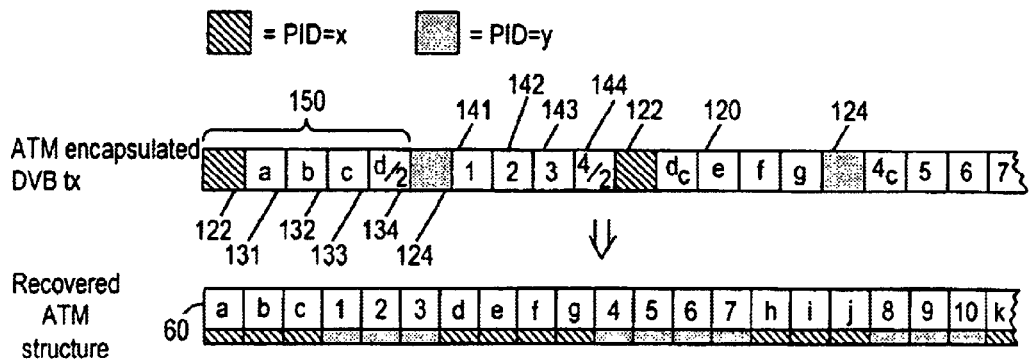
FIG. 3 shows ATM encapsulation within DVB transport stream packets and ATM cell recovery according to the preferred mechanisms of the present invention.
FIG. 4 shows a conventional ATM switch fabric routing table.

Essentially, according to the present invention, the mapping of DVB PIDs onto separate ATM PHYs (ATM physical layer parts) allows the ATM cells to be recovered with a minimum of buffering and preserves the semantics of the VPI/VCI address space: this is shown in FIG. 4 and the effective packet structure of FIG. 3. Advantageously, therefore, a mixture of encapsulated ATM cells within a DVB shell can be interpreted at an addressed terminal 18–22 (of FIG. 2) by having the ATM switch core 108 strip-out ATM cells and then to route them accordingly (based, to some extent on the VPI/VCI information). In other words, multiple information sources can be simultaneously supported in transmissions across a satellite system using different PIDs, since the PID can be subsequently used to select relevant transport stream packets for coherent re-assembly. The whole VPI/VCI space is therefore useable by each content provider or information source.

Turning to FIG. 3, a PID is assigned to each up-link, with each PID therefore representing a logically (and potentially physically) separate access interface from a content provider. A DVB-S frame 120 is therefore constructed with a specific PID header 122–124 (of which only two are shown for exemplary purposes and for the reasons of clarity) associated with ATM traffic cells. The ATM cells provided from a specific content provider are therefore ostensibly contiguous within the DVB-S frame 120, although ATM cells from a specific content provider are transmitted in bursts of, preferably, three-and-a-half ATM cells. In this way, ATM cells (a, b, c and d/2) associated with PID (and hence content provider) "x" are transmitted as a batch of three entire cells (a-c. 131–133) and then a half cell (d/2, 134), which is then interleaved (or multiplexed) with ATM cells associated with a different PID (and hence different content provider) "y". Again, in a similar way to the first ATM cell transmission batch. ATM cells associated with PID "y" are transmitted as a batch of three entire cells (141) and then a half cell (144). The sequence continues in a similar fashion for subsequent ATM cell batches from the respective content providers, although it should be noted that it may be preferably to delay, in time, any half cell transmissions to the end of any batch so as to maximise of ATM cell alignment within a transport stream packet 150 associated with a particular content provider. Basically, the system operates to ensure that a successive transport stream packet 150 mops-up any previous incomplete transmission of data associated with a particular ATM cell. In other words, if at the end of a transport stream packet a partial ATM cell remains, the partial ATM cell is queued (i.e. buffered) until the arrival of the next transport packet on the same PID.

Of course, the system contemplates the granting of satellite access from a single content provider such that consecutive or contiguous transport stream packets are associated with a single content provider and hence each reference a single PID. The ordering of PIDs within an overall frame structure of the transport stream may therefore represent a mechanism for service prioritisation. Generally, ATM cells from different PIDs are interleaved on the Utopia output 106.

Upon decoding of the DVB multiplexed satellite transmission (74 and 102) at the terminal or subscriber unit 18–22, the PID is used by the transputer or signal processor 101 to identify a particular content provider. Buffering of ATM cells in relation to a particular content provider effectively circumvents the time separation of half ATM cell transmissions, and so an internally compliant ATM Utopia stream can be generated (as shown by frames 160–162). it Is noted that the internally compliant ATM Utopia streams are structured to always maintain the exact sequence of ATM cell generation for each content provider (as shown in frame 160). In other words, strict order preservation for each source stream is mandatory.

By way of intermediate summary, broadband information from physically distinct content providers is multiplexed into a DVB frame structure in which PIDs are mapped from ATM PHYs. Transmission through the satellite system is then accomplished in a single DVB compliant stream. Regeneration of coherent ATM cells is then effected by an addressed terminal or subscriber unit that uses the PID to map back into an ATM domain address and path, with buffering applied to offset any ATM cell data separation that has occurred as a consequence of partial ATM cell transmission within a DVB transport stream packet.

In a DVB demultiplexer (typically realised within the transputer 101 of FIG. 2) of a preferred embodiment, separate queues are maintained (i.e. buffered) for each ATM stream associated with a particular content provider. The length of each queue is one ATM cell. Preferably, whenever a full ATM cell is available, it is output on the Utopia bus 106 prepended by an additional octet (applied by the programmable DVB demultiplexer or signal processor 101) indicating the source PHY. The PHY octet value can be table driven or algorithmically derived from the PID.

As with at least most (if not all) ATM switch fabrics, an incident input to the ATM switch core 108 may not, in fact, represent an appropriate output path for the broadband connection and so a mapping function, as exemplified in FIG. 4, may be required between the Utopia interface 106 and an eventual (routed) broadband output. The requirement for a broadband input to broadband output route function is the exemplary form of FIG. 4 holds particularly true for a centralised ATM switch fabric arrangement, although the routing table would need to be extended (as will readily be appreciated) to accommodate a self-routing switch fabric configuration.

FIG. 5 illustrates a PID to PHY mapping function 170 used within a preferred embodiment of the present invention. As will now be fully appreciated, the satellite ground station 30 (or content provider if it has a direct satellite up-link capability) substitutes broadband (such as ATM PHY) physical layer identity information with an allocated PID. In a preferred embodiment, the mapping of PID to PHY may be such as to provide a contiguous listing of PHYs or there may be a fixed, one-to-one napping of PHYs to PIDs. In the former respect the mapping function is analogous to an electronic programme guide.

FIG. 6 shows a system embodiment of the present invention in which a plurality of content providers 32–36 have independent access to satellite up-link paths (74, 74a, 74b). To address the issue of non-collision in PID assignment, either each content provider 32–36 must be pre-allocated with a unique PID that is further known to the addressed terminal or subscriber unit 18–22, or a central controller 180 must administer allocation of PIDs an a system wide level. The central controller 180 must also indicate to the addressed terminal or subscriber unit 18–22 the PID that is allocated to each PHY, i.e. the mapping information contained in FIG. 5 must be relayed. Such information relay may be accomplished by one of a number of conventional techniques, including the use of wireless or dedicated wireline communication resources.

If the satellite system does, in fact, offer a multiple output capability in which other satellites can be addressed and hence routed to, then each satellite 12–12a may require access to the PID/PHY mapping function (described in relation to FIG. 5). This is particularly the case when DVB multiplexing is actioned with the satellite itself and not the satellite ground station or context provider.

By way of brief summary of the various aspects of the present invention, different PIDs are used for each source and a recipient or terminal is considered as being connected to each source via a different ATM physical port (PHY). The recipient or terminal responsive to the encapsulated broadband cells includes a DVB demultiplexer that is programmed to look at all the PIDs for all the sources and, in a preferred embodiment, connects to the rest of the terminal using a single multi-PHY Utopia bus. In the DVB demultiplexer, if is preferred that separate queues of length one ATM cell are maintained for each ATM stream. Then, whenever a full ATM cell is available, it is output of the Utopia bus prepended by an additional octet indicating the PHY source. If a partial cell is left at the end of a transport stream packet, it is queued until the arrival of the next transport stream on the same PID. ATM cells, for example, can therefore be interleaved on the output provided by the Utopia bus.

As will be understood, the above description has been given by way of example only and that modifications in detail may be made within the scope of the present invention. For example, it will be appreciated that reference is made to ATM cell transmission by way of example only and that the principal can be applied to similar packet-based or cell-based broadband systems. Consequently, the any reference to ATM cells should be construed broadly to include other forms of broadband packet data schemes.

What is claimed is:

1. A method of conveying data from a plurality of content providers across a satellite system supporting broadband communication, the method comprising:

encapsulating, utilising a digital video broadcasting (DVB) protocol, a mixture of full and partial broadband cells but at least a partial broadband cell into a transport stream packet having a physical identity (PID) header; and DVB multiplexing transport stream packets having different PID headers;

the step of encapsulating further including:

mapping the broadband cells from a particular content provider onto a PID associated with that particular content provider;

whereby each transport stream packet contain information from a specific content provider identified by the PID header of the transport stream packet.

2. The method of conveying data according to claim 1, the satellite system comprising a least one satellite and at least one station having an up-link, the step of DVB multiplexing being performed at at least one of said at least satellite and said at least one station having said up-link.

3. The method of conveying data according to claim 1, further comprising:

at a recipient device responsive to the transport stream packet, deriving a broadband physical layer part (PHY) from the PID header; and from the transport stream packet, recovering and then outputting broadband cells with their associated broadband PHYs.

4. The method of conveying data according to claim 1, further comprising:

determining whether the transport stream packet received by the recipient device is part of an elementary stream assigned to carry broadband traffic.

5. The method of conveying data according to claim 4, wherein the step of determining further comprises cross-referencing the PID of the transport data packet with broadband PHY information.

6. The method of conveying data according to claim 3, further comprising buffering any partial broadband cell received in the transport stream packet and referencing any such buffered partial broadband cell with a stream label.

7. The method of conveying data according to claim 6, further comprising:

reviewing the stream label of any buffered partial broadband cell upon receipt of successive transport stream packets; and outputting the buffered partial broadband cell with an associated broadband PHY in the event that the successive transport stream packet contains an associated partial broadband cell that is complementary to the buffered partial broadband cell, and such that a complete broadband cell with associated broadband PHY is constructed and output from a combination of the buffered partial broadband cell and the associated partial broadband cell.

8. The method of conveying data according to claim 1, wherein the step of encapsulating further includes encapsulating residual partial broadband cell information from a previous stream packet associated with a particular content provider into a next available transport stream packet assigned to that particular content provider.

9. The method of conveying data according to claim 7, further comprising preserving an order in the output of broadband cells originating from each content provider.

10. A satellite system supporting a transmission of broadband data, the satellite system comprising:

a communication device having:

means for encapsulating a mixture of full and partial broadband cell but at least a partial broadband cell into a transport stream packet having a physical identity (PID) header; and means for mapping the broadband cells from a particular content provider onto a PID associated with that particular content provider and such that each transport stream packet contains information from a specific content provider identified by the PID header of the transport stream packet.

11. The satellite of claim 10, wherein the communication device is one of satellite, a ground station and terminal associated with a content provider.

12. The satellite system of claim 10, wherein the means for encapsulating utilises a digital video broadcasting (DVB) protocol to encapsulate broadband cells.

13. The satellite of claim 10, wherein the satellite system comprises a satellite and a station having an up-link capability, and wherein at least one of the satellite and the station comprises a DVB multiplexer to multiplex transport stream packets having different PID header.

14. The satellite system of claim 10, further comprising a recipient communications device responsive to the transport stream packet, the recipient device having:
 means for deriving a broadband physical layer part (PHY) from the PID header; and
 means for recovering and then outputting broadband cells with their associated broadband PHYs from the transport stream packet.

15. The satellite system of claim 10, wherein the recipient communication device further includes means for determining whether the transport stream packet received by the recipient device is part of an elementary stream assigned to carry broadband traffic.

16. The satellite system of claim 15, wherein the recipient communications device comprises an associated intelligence that relates PIDs to broadband PHY information and wherein the recipient communication device further includes means for cross-referencing the PID of a received transport data packet with broadband PHY information.

17. The satellite system of claim 16, wherein the recipient communication device further includes:
 a buffer for temporary storing broadband cells; and
 means for buffering any partial broadband cell received in the transport stream packet and referencing any such buffered partial broadband cell with a stream label.

18. The satellite system of claim 17, wherein the recipient communication device further includes:
 means for reviewing the stream label of any buffered partial broadband cell upon receipt of successive transport stream packets; and
 means for outputting the buffered partial broadband cell with an associated broadband PHY in the event that the successive transport stream packet contains an associated partial broadband cell that is complementary to the buffered partial broadband cell, and such that a complete broadband cell with associated broadband PHY is constructed and output from a combination of the buffered partial broadband cell and the associated partial broadband cell.

19. The satellite system of claim 18, wherein the means for outputting co-operates with the buffer to preserve an order in the output of broadband cells originating from each content provider.

20. The satellite system of claim 14, wherein the recipient device comprises a DVB demultiplexer to demultiplex transport stream packets having different PID header into broadband cells.

21. The satellite system of claim 10, wherein the means for encapsulating operates to encapsulates residual partial broadband cell information from a previous transport stream packet associated with a particular content provider into a next available transport stream packet assigned to that particular content provider.

22. A broadband communication device having:
 means for encapsulating a mixture of full and partial broadband cells but at least a partial broadband cell into a transport stream packet having a physical identify (PID) header; and
 means for mapping broadband cells from a particular content provider onto a PID associated with that particular content provider and such that each transport stream packet contains information from a specific content provider identified by the PID header of the transport stream packet.

23. The broadband communication device of claim 22, wherein the communication device is one of a satellite, a ground station and terminal associated with a content provider.

24. The broadband communication device of claim 22, wherein the means for encapsulating utilises a digital video broadcasting (DVB) protocol to encapsulate broadband cells.

25. The broadband communication device of claim 22, further comprises of DVB multiplexer to multiplex transport stream packets having different PID header.

26. A receiver responsive to satellite-relayed broadband signals encapsulated in a transport stream packet having a physical identify (PID) header, the broadband signals being a mixture of full and partial broadband cells but at least a partial broadband cell, the receiver having:
 means for deriving a broadband physical layer part (PHY) from the PID header; and
 means for receiving and the outputting broadband cells with their associated broadband PHY from the transport stream packet.

27. The receiver of claim 26, further including means for determining whether the transport stream packet received thereby is part of an elementary stream assigned to carry broadband traffic.

28. The receiver of claim 27, further comprising an associated intelligence that relates PIDs to broadband PHY information and wherein the receiver further includes means for cross-referencing the PID of a received transport data packet with broadband PHY information.

29. The receiver of claim 26, further including:
 a buffer for temporary storing broadband cells; and
 means for buffering any partial broadband cell received in the transport stream packet and referencing any such buffered partial broadband cell with a stream label.

30. The receiver of claim 17, further including:
 means for reviewing the stream label of any buffered partial broadband cell upon receipt of successive transport stream packets; and
 means for outputting the buffered partial broadband cell with an associated broadband PHY in the event that the successive transport stream packet contains an associated partial broadband cell that is complementary to the buffered partial broadband cell, and such that a complete broadband cell with associated broadband PHY is constructed and output from a combination of the buffered partial broadband cell and the associated partial broadband cell.

31. The receiver of claim 30, wherein the means for outputting co-operates with the buffer to preserve an order in the output of broadband cells originating from each content provider.

32. The receiver of claim 26, further having a DVB demultiplexer to demultiplex transport stream packets into broadband cells, each transport stream packet having a specific PID header.

33. A method of receiving satellite-relayed broadband signals encapsulated in a transport stream packet having a physical identity (PID) header, the broadband signals being a mixture of full and partial broadband cells but at least a partial broadband cell, wherein each transport stream packet contains information from a specific one of a plurality of content providers identified by the PID header of the transport stream packet, the method of recovering the broadband signals comprising:

deriving a broadband physical layer part (PHY) from the PID header; and regenerating and then outputting broadband cells with their associated broadband PHYs from the transport stream packet.

34. The method of recovering satellite-relayed broadband signals according to claim 33, further comprising:

determining whether the received transport stream packet is part of an elementary stream assigned to carry broadband traffic.

35. The method recovering satellite-relayed broadband signals according to claim 34, wherein the step determining further comprises cross-referencing the PID of the transport date packet with broadband PHY information.

36. The method of recovering satellite-relayed broadband signals according to claim 33, further comprising buffering any partial broadband cell received in the transport stream packet and referencing any such buffered partial broadband cell with a stream label.

37. The method of recovering satellite-relayed broadband signals according to claim 36, further comprising:

reviewing the stream label of any buffered partial broadband cell upon receipt of successive transport stream packets; and outputting the buffered partial broadband cell with an associated broadband PHY in the event that the successive transport stream packet contains an associated partial broadband cell that is complementary to the buffered partial broadband cell, and such that a complete broadband cell with associated broadband PHY is constructed and output from a combination of the buffered partial broadband cell and the associated partial broadband cell.

38. The method of recovering satellite-relayed broadband signals according to claim 33, wherein the broadband cells are ATM cells.

* * * * *